(12) United States Patent
Bucknell

(10) Patent No.: US 9,849,596 B2
(45) Date of Patent: Dec. 26, 2017

(54) DEVICE AND METHOD FOR HANDLING COMPONENTS, PREFERABLY COMPONENTS TO BE COATED

(75) Inventor: Thomas A. Bucknell, White Lake, MI (US)

(73) Assignee: Durr Systems GmbH, Bietigheim-Bissingen (DE)

( * ) Notice: Subject to any disclaimer, the term of this patent is extended or adjusted under 35 U.S.C. 154(b) by 472 days.

(21) Appl. No.: 13/695,975

(22) PCT Filed: Apr. 27, 2011

(86) PCT No.: PCT/EP2011/002116
§ 371 (c)(1),
(2), (4) Date: Jul. 24, 2013

(87) PCT Pub. No.: WO2011/134654
PCT Pub. Date: Nov. 3, 2011

(65) Prior Publication Data
US 2013/0292958 A1 Nov. 7, 2013

(30) Foreign Application Priority Data

Apr. 27, 2010 (DE) .......................... 10 2010 018 468

(51) Int. Cl.
*B66C 1/42* (2006.01)
*B25J 15/00* (2006.01)

(52) U.S. Cl.
CPC ................................. *B25J 15/0023* (2013.01)

(58) Field of Classification Search
CPC ............ Y10S 294/902; Y10S 294/907; Y10S 414/141; H01L 21/68707; B66C 1/422;
B66C 1/46; B25J 9/104; B25J 15/0009;
B25J 15/0023; F16J 3/047; G01F 3/225;
A61F 5/012; B21D 43/105
USPC ............................... 294/119.3, 208, 902, 907
See application file for complete search history.

(56) References Cited

U.S. PATENT DOCUMENTS

| | | | | | |
|---|---|---|---|---|---|
| 2,589,101 | A | * | 3/1952 | Leguillon et al. | 414/619 |
| 3,090,049 | A | * | 5/1963 | Lanteigne | 623/64 |
| 3,255,893 | A | * | 6/1966 | Hainer et al. | 414/728 |
| 3,347,587 | A | * | 10/1967 | Frost | 294/87.1 |
| 3,574,386 | A | * | 4/1971 | Frost | 294/87.1 |
| 4,273,505 | A | | 6/1981 | Clark | |
| 4,770,456 | A | * | 9/1988 | Phillips et al. | 294/93 |
| 4,783,108 | A | | 11/1988 | Fukuyama | |
| 4,784,042 | A | * | 11/1988 | Paynter | 91/534 |
| 4,928,926 | A | * | 5/1990 | Bloemendal et al. | 254/93 R |
| 5,083,498 | A | * | 1/1992 | Sato et al. | 92/92 |

(Continued)

FOREIGN PATENT DOCUMENTS

| | | |
|---|---|---|
| CN | 101316686 A | 12/2008 |
| DE | 33 10 192 A1 | 10/1984 |

(Continued)

*Primary Examiner* — Stephen Vu
(74) *Attorney, Agent, or Firm* — Bejin Bieneman PLC

(57) ABSTRACT

A component-handling device for handling components to be coated comprises a grasping element capable of having at least one of its volume and its shape changed to grasp a component, whereby the component can be handled. A method for handling components to be coated comprises changing at least one of a volume and a shape of the grasping element to grasp a component, thereby handling the component.

8 Claims, 6 Drawing Sheets

(56) References Cited

U.S. PATENT DOCUMENTS

Figure 1:
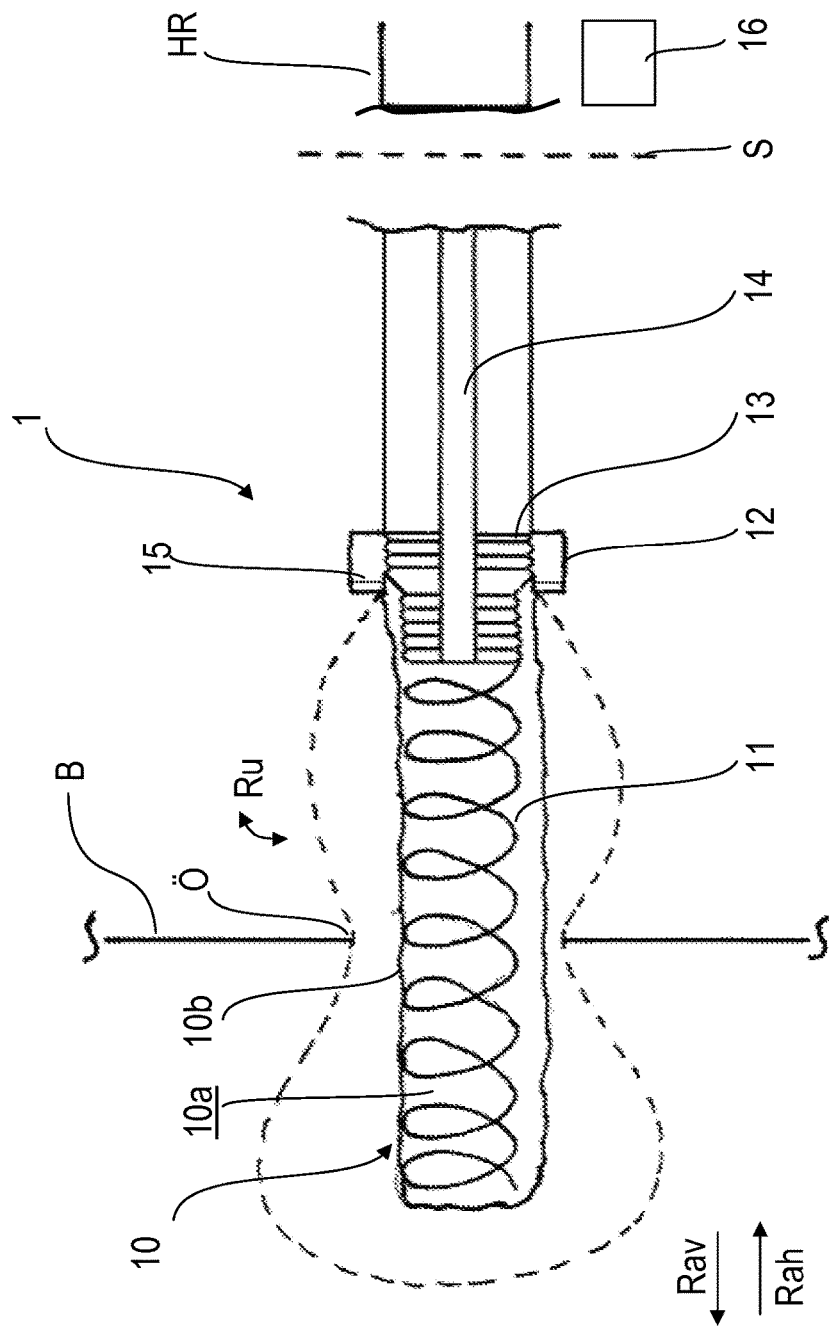

| | | | |
|---|---|---|---|
| 5,090,758 A | | 2/1992 | Lord |
| 5,251,538 A | * | 10/1993 | Smith ............................. 92/34 |
| 6,484,601 B1 | * | 11/2002 | Arrichiello ............... 74/490.04 |
| 6,846,029 B1 | * | 1/2005 | Ragner et al. ............... 294/86.4 |
| 2004/0186626 A1 | | 9/2004 | Tsukamoto |
| 2006/0028041 A1 | * | 2/2006 | Ono et al. ................ 294/119.3 |
| 2007/0107193 A1 | | 5/2007 | Milojevic |
| 2009/0045564 A1 | | 2/2009 | Milojevic |
| 2011/0166708 A1 | | 7/2011 | Herre |
| 2012/0191243 A1 | | 7/2012 | Haas |

FOREIGN PATENT DOCUMENTS

| | | |
|---|---|---|
| DE | 10 2006 050 114 A1 | 5/2007 |
| DE | 10 2009 012 140 A1 | 9/2010 |
| JP | S609694 | 1/1985 |
| JP | S60-186195 | 12/1985 |
| JP | S63-112392 | 11/1988 |
| JP | 04-115892 | 4/1992 |
| JP | 08-294885 | 11/1996 |
| JP | 09-011169 | 1/1997 |
| JP | 2002-166383 | 6/2002 |
| JP | 2003-011078 | 1/2003 |
| JP | 2004-255527 A | 9/2004 |
| JP | 2002-210689 A | 5/2007 |
| WO | WO 2010/025827 | 3/2010 |

* cited by examiner

DEVICE AND METHOD FOR HANDLING COMPONENTS, PREFERABLY COMPONENTS TO BE COATED

This application claims priority to PCT Application No. PCT/EP2011/002116, filed Apr. 27, 2011, and hence to the application to which the foregoing PCT application claims priority, German application DE 10 2010 018 468, filed Apr. 27, 2010; this application hereby incorporates by reference all of each of said applications in their entireties.

The invention relates to a device and a method for handling components to be coated, such as, e.g., vehicle parts, particularly hoods, doors, flaps or the like of motor vehicle bodies or other vehicles.

Devices used in coating/painting installations for handling components to be coated, such as, e.g., hoods, doors, flaps or the like of motor vehicle bodies, generally include hooks, pins or magnets which are brought into engagement with the component to be coated. The devices are often guided by handling robots, in order in particular to open, to hold and/or to close the components to be coated, as a result of which, e.g., an all-round coating of the motor vehicle bodies is enabled.

In order to be able to ensure a secure engagement between hooks, pins and the component to be coated, the hooks and pins must be configured to grasp structures on the component to be coated. It is problematic that the components to be coated generally only have a few to no suitable grasping structures for grasping with hooks or pins, and even should suitable structures be available for grasping, these vary in dependence on the different components to be coated. Thus, there is disadvantageously a requirement for a multiplicity of different hooks or pins, in order to be able to handle a multiplicity of different components to be coated. The tolerances in the body shell, that is to say on the body, are considerable, for which reason grasping with the above elements, e.g., hooks and pins, is problematic.

It is known to fasten to the components to be coated one or a plurality of graspable structures, with which the hooks or the pins can be brought into engagement. These removable graspable structures are configured in such a manner that they can be securely grasped by the hooks or pins. It is disadvantageous however that the removable graspable structures must be mounted and unmounted again by a worker, which is time-consuming and cost-intensive. Furthermore, removable graspable structures of this type must be cleaned, as they are mounted in an exposed position on the component to be coated and therefore can be contaminated by coating agents (e.g. overspray), which is time-consuming and cost-intensive. Further, the graspable structures must be stored, which is likewise found to be disadvantageous.

Further, the hooks and pins in prior systems are for the most part essentially rigid parts, which in the case of an undesired impact with a component to be coated can damage the component (e.g. deformations, material removal or other undesired changes), itself or the robot guiding the hook or the pin.

Also it may occur that e.g. hoods or doors to be opened are jammed. If a rigid hook or pin according to a prior system is used to open a jammed hood or door, damage to the hook or pin, or else damage to the component to be coated (e.g. by means of parts breaking off), or to the robots guiding the hook or the pin, may likewise occur.

For a safe handling/coating process, it is important that it is possible to establish whether a component to be coated or to be handled is present, in particular whether the component is grasped by the hook or the pin or not. Establishing whether a component to be coated is grasped by the hook or the pin or not takes place in prior systems for the most part by means of electrical signals which must be intrinsically safe (e.g., paint booths are for the most part defined as regions with potentially explosive atmospheres) and which are communicated to a programmable logic controller (PLC) or a control of a robot which guides the hook or pin, which requires a complex technology (e.g. switches, sensors, etc.) and disadvantageously increases the complexity and the costs of the system.

Furthermore, an important requirement often not realized by known grasping systems is that no surfaces to be painted may be touched or covered, as this can lead to imperfect coatings.

In the light of the above there is a need to solve or overcome the above described problems or disadvantages.

The claimed invention is not limited, however, to embodiments that remedy all of the problems or disadvantages of prior systems discussed above. The invention also claims general protection, e.g., for the exemplary embodiments described below.

A device may be provided, e.g., for handling components preferably to be coated, such as vehicle parts, motor vehicle bodies or hoods, flaps, doors or the like of motor vehicle bodies or other vehicles, or else other components to be handled.

The device may be provided in order to be guided by a (handling) robot, painting robot or manipulator, e.g., so that a hood, flap and/or door of a motor vehicle body can be opened, held and/or closed.

The device is advantageously applied in a coating/painting installation for motor vehicle bodies and add-on parts of motor vehicle bodies.

The device may comprise a grasping element or gripping element, which can preferably be changed in terms of volume and/or changed in terms of shape, in order to grasp the component, as a result of which the component can be handled.

The grasping element can further be changed in terms of volume and/or changed in terms of shape, in order to release the grasping of the component, particularly after executed handling of the component.

As the grasping element can be changed in terms of volume and/or changed in terms of shape, the grasping element can be used for a multiplicity of different graspable sections (e.g. graspable sections with different order of magnitude or different geometry) located on the components. Graspable sections may include, e.g., the internal contours of openings in the component (particularly small openings e.g. handle openings, lock openings, such as openings for door locks, hood locks and/or trunk/hatchback locks or similar openings) or adjacent sections of the openings.

Further, the grasping element can be smoothly and pliably adapted to the (different) graspable sections on account of the volume changeability and/or shape changeability, which minimizes or overcomes the risk of damaging the graspable section or the component.

It is further advantageous that the grasping element is able to grasp the component at unexposed sections, e.g. sections not to be coated of a motor vehicle body (e.g. on the internal contour of an opening of the component or even completely behind the opening or in a hollow space of the component), as a result of which the surface of the component to be coated is not covered or impaired by means of the grasping element.

Further, by means of the volume changeability and/or the shape changeability, an operationally reliable device for handling components preferably to be coated or an operationally reliable grasping element can advantageously be provided in a simple manner. The operational reliability ensures that even in the event of faults, an unsafe state does not occur and/or the risk of damaging the component, the grasping element, and/or the robot guiding the grasping element is at least minimized, and possibly eliminated.

Operational reliability can, e.g., be ensured in that the grasping element yields in such manner in the case of overloading (e.g., a jammed door or hood to be handled) on account of the volume changeability and/or the shape changeability, that the grasping between grasping element and component is released, or in that the tear resistance of the grasping element is chosen in such a manner that the grasping element tears, as a result of which at least the risk of damaging the component and the robot guiding the grasping element can be minimized or prevented.

The grasping element may include a shape-enlarged and/or volume-enlarged and/or expanded and/or blown-up and/or internal-pressure-loaded and/or inflated state (collectively designated as "expanded state" in the following for reasons of brevity). Further, the grasping element can comprise a shape-downsized and/or volume-downsized and/or essentially de-expanded and/or deflated and/or slackened and/or slack state (collectively designated as "essentially de-expanded state" in the following for reasons of brevity). The essentially de-expanded state can preferably also comprise states in which although the grasping element is expanded (e.g. pressure- or fluid-loaded), it is to an extent at which no grasping of the component takes place.

The grasping element can in particular be changed in terms of shape and/or changed in terms of volume by means of fluid supply and/or fluid removal (e.g. fluid withdrawal or draining fluid). Further, the grasping element can preferably be changed in terms of shape and/or changed in terms of volume by pressure increase (e.g. to a pressure, which is higher than atmospheric pressure) and/or by pressure reduction (e.g. to essentially atmospheric pressure or a pressure, which keeps the grasping element in a shape and/or orientation with which the grasping element can be guided in a pinpointed manner in and/or through an opening in the component, and/or with which the grasping element can be guided safely out of the opening again). Fluid supply or pressure increase preferably leads to the grasping element expanding or being enlarged and/or the component being grasped, wherein fluid removal or pressure reduction preferably leads to the grasping element de-expanding or downsizing and/or the grasping of the component being released.

For example, it is possible to supply a fluid to the grasping element, in order to increase the internal pressure of the grasping element relative to the atmospheric pressure and/or in order to increase the volume and/or the shape of the grasping element (or to bring the same into an expanded state), as a result of which the component can preferably be grasped.

It is also possible that fluid is removed from the grasping element, in order to reduce the internal pressure of the grasping element, e.g., to essentially atmospheric pressure and/or in order to downsize the volume and/or the shape of the grasping element (or to bring the same into the essentially de-expanded state), as a result of which the grasping of the component can preferably be released.

The device can, e.g., comprise an apparatus for fluid supply and/or fluid removal (e.g., fluid withdrawal or draining of fluid) or be constructed in order to be connectable to such an apparatus.

The enlarging or the expanding of the grasping element and/or the volume and/or the shape of the grasping element preferably takes place by axial elongation and/or circumferential enlargement or enlargement in the radial direction, whereas the downsizing or the de-expansion of the grasping element and/or the volume and/or the shape of the grasping element correspondingly takes place by axial shortening and/or by circumferential downsizing or downsizing in the radial direction.

The grasping element may be provided, i.e., configured, (in the essentially de-expanded state) to be guided in and/or through an opening in the component, particularly in order to be changed in terms of shape and/or changed in terms of volume (or to be brought into an expanded state) in and/or downstream of and/or upstream of the opening, as a result of which the component can be grasped.

It is even possible that the grasping element is brought into the expanded state essentially completely downstream of the opening in the component, as a result of which the grasping element, e.g., during the coating process is on the one hand advantageously arranged in a contamination-proof position and on the other hand advantageously does not cover or impair the surfaces of the component to be coated.

In particular, the grasping element may be provided, i.e., configured, in an expanded state, to be pressed against the component, in particular against the internal contour of the opening of the component, in order to form a positive fit, a non-positive fit and/or a friction fit with the component. Further, the grasping element may be provided in order, in an essentially de-expanded state, to release the pressure loading on the component, in particular on the internal contour of the opening of the component, in order to release the positive fit, the non-positive fit and/or the friction fit with the component.

The grasping element may be provided, i.e., configured, to adapt to the internal contour of an opening in the component at least in sections or completely. For example, the grasping element can completely fill or close the opening in the component in an expanded state and/or completely contact the internal contour of the opening or the adjacent sections of the opening, as a result of which a large contact area between grasping element and component can advantageously be achieved. This creates a better stress distribution compared to an essentially punctiform grasping of a hook or a pin according to the prior art.

The grasping element can be at least one of the following: extensible, inextensible, flexible, elastic, resilient, fluid-tight, balloon-like, inflatable, film-like, membranous (e.g. produced from a film or a membrane), a hollow body, changeable in terms of shape in a balloon-like manner, changeable in terms of volume in a balloon-like manner, reversibly changeable in terms of shape and/or in terms of volume, particularly expandable, and having memory effect (e.g. constructed from a material which has a memory or shape-memory effect).

The grasping element may be produced from a plastic, e.g., from a thermoplastic polyurethane. An example for a particularly suitable plastic is the material known under the trade name Desmopan® from Bayer which is described in the document "Desmopan®—Typenübersicht—Richtwerte, Ausgabe 10.2008", the entire content of which is incorporated by reference herein in its entirety.

The device can further comprise a support part, which keeps the grasping element in a certain shape and/or orientation, e.g., in order to guide the grasping element in a pinpointed manner in and/or through an opening in the component, and/or in order to guide the grasping element safely out of the opening. The grasping element can also have a memory or shape-memory effect, in order to keep the grasping element in a certain shape and/or orientation in which it can, e.g., be guided in pinpointed manner in and/or through an opening in the component and/or in which it can, e.g., be guided safely out of the opening. Thus, it can advantageously be ensured that the grasping element in the essentially de-expanded state can be guided safely through and/or into the opening and out again.

The support part may be arranged in the grasping element and constructed in a flexible, elastic and/or resilient manner, in particular constructed as a spring. Preferably, the support part is surrounded by the grasping element or accommodated in the grasping element or the volume thereof.

The grasping element can consist of a single fluid- and/or pressure-loadable chamber or be divided into a plurality of chambers. The plurality of fluid- and/or pressure-loadable chambers can be loaded with fluid and/or pressure sequentially and/or in parallel.

The device can further comprise a predetermined breaking point, which, e.g., breaks if the component jams during handling. It is also possible that the grasping element comprises a fastening means for connecting to a fastening structure of the device, wherein the connection is released, e.g., without damage if the component jams during handling. Further, the tear resistance of the grasping elements can be chosen in such a manner that the grasping element tears if the component jams during handling. Although the grasping element is damaged in the previously mentioned case, the component to be coated or the robot guiding the grasping element is not.

The handling device may include a fluid-supply/drain channel for supplying and/or draining fluid, wherein the fluid supply/drain channel opens in the grasping element and/or the volume.

Further, the grasping element may have at least one fluid supply/drain opening, which can for example be connected to the fluid supply/drain channel.

Further, the device can comprise an interface for connecting to a robot and/or an interface for connecting to an apparatus for fluid supply and/or fluid removal.

The device further may have an apparatus for detecting and/or monitoring and/or determining and/or establishing various operating states and/or operating processes of the grasping element and/or of the component (e.g. incorrect grasping, absence of a component, particularly "component not grasped" or other defective states or processes, such as, e.g., a too strong force, pressure or stress loading of the grasping element onto the component or a jamming component, but also, e.g., correct grasping between the grasping element and component, particularly "component grasped" or other correct states or processes), particularly on the basis of at least one fluid pressure and/or at least one fluid volume, with which the grasping element is loaded. The operating states or operating processes can, e.g., comprise the force, the stress or the pressure with which the grasping element grasps or loads the component. This is advantageous, because, e.g., a too large force, stress or pressure could damage the component.

The device can therefore be provided to control (or to regulate) or to change the fluid volume and/or the fluid pressure, with which the grasping element is loaded dependent on, e.g., one or a plurality of previously mentioned operating states or operating processes (e.g., also during handling). Thus, for example the force, the stress and/or the pressure loading of the grasping element onto the component can be monitored and controlled, particularly limited, in order to avoid damaging the component and possibly also the grasping element.

For example, the device, particularly the apparatus for detecting and/or determining and/or establishing various operating states or operating processes of the grasping element and/or of the component, has one or a plurality of sensors (e.g., force sensors, pressure sensors, volume sensors, etc.).

It is advantageous that operating states or operating processes of the grasping element and/or of the component can be established, monitored or determined on the basis of values or parameters which are already known from the control of the device and/or can be determined therefrom without any problems, without the requirements for additional mechanical or electrical components, such as, e.g., further switches, sensors, etc.

The apparatus can have a first detection unit which is provided in order to detect and/or to determine a fluid pressure or a plurality of fluid pressures, with which the grasping element is loaded (supply and/or drain).

The apparatus can have a second detection unit which is provided in order to detect and/or to determine a fluid volume or a plurality of fluid volumes (fluid quantities), with which the grasping element is loaded (supply and/or drain).

It is possible that the fluid volume or the fluid volumes, with which the grasping element is loaded are always essentially of the same size, as they, e.g., originate from one or a plurality of dosing organs with a certain constant volume in each case, for which reason it is possible that no volume or volumetric flow measurement becomes necessary.

Further, the apparatus may have a determination and/or creation unit, in order to determine and/or to create one or a plurality of fluid pressure/fluid volume curves based on the at least one detected fluid pressure and the at least one detected fluid volume and/or based on the at least one fluid pressure and the at least one fluid volume with which the grasping element is loaded.

Also the apparatus can comprise a comparison and/or establishing unit in order to compare at least one determined and/or created fluid pressure/fluid volume curve with at least one reference fluid pressure/fluid volume curve stored in a memory, as a result of which it is, e.g., possible to establish whether a component is grasped or not (whether a component is correctly present or not), whether a component jams or not, and whether a component is handled correctly or defectively.

The reference fluid pressure/fluid volume curves can e.g. describe typical defective states or processes, but also correct states or processes, and, e.g., be tailored to different components or graspable sections. The reference fluid pressure/fluid volume curves can be determined by simple experiments.

If the determined and/or created fluid pressure/fluid volume curve does not correspond to a reference fluid pressure/fluid volume curve which describes a correct process or state, then the conclusion can be drawn that a defective state or process is generally present.

If the determined and/or created fluid pressure/fluid volume curve essentially corresponds to a reference fluid pressure/fluid volume curve, then the conclusion can be drawn that a correct process state is present or that a certain defective state or process is present.

Further, a manipulator or robot (particularly a painting and/or handling robot), preferably a SCARA robot ("Selective Compliance Assembly Robot Arm") or a robot with up to 7 degrees of freedom, may include a handling device as described previously.

Examples of such (handling) robots are known from WO 2010/025827 A1 and DE 10 2009 012 140, so the content of these publications is to be incorporated in the present description with regard to the design construction of the (handling) robots.

Further, a method is provided, e.g., for handling components to be coated, e.g., carried out by a device and/or a robot as described previously, wherein a grasping element is changed in terms of shape and/or changed in terms of volume, in order to grasp the component, and the grasped component is handled.

Further method steps arise directly from the above description of the device, in particular from the functionality of the device.

A balloon-like grasping element may be used for grasping and/or handling doors, flaps, hoods or the like of motor vehicle bodies or other vehicle parts.

Figure 2A:
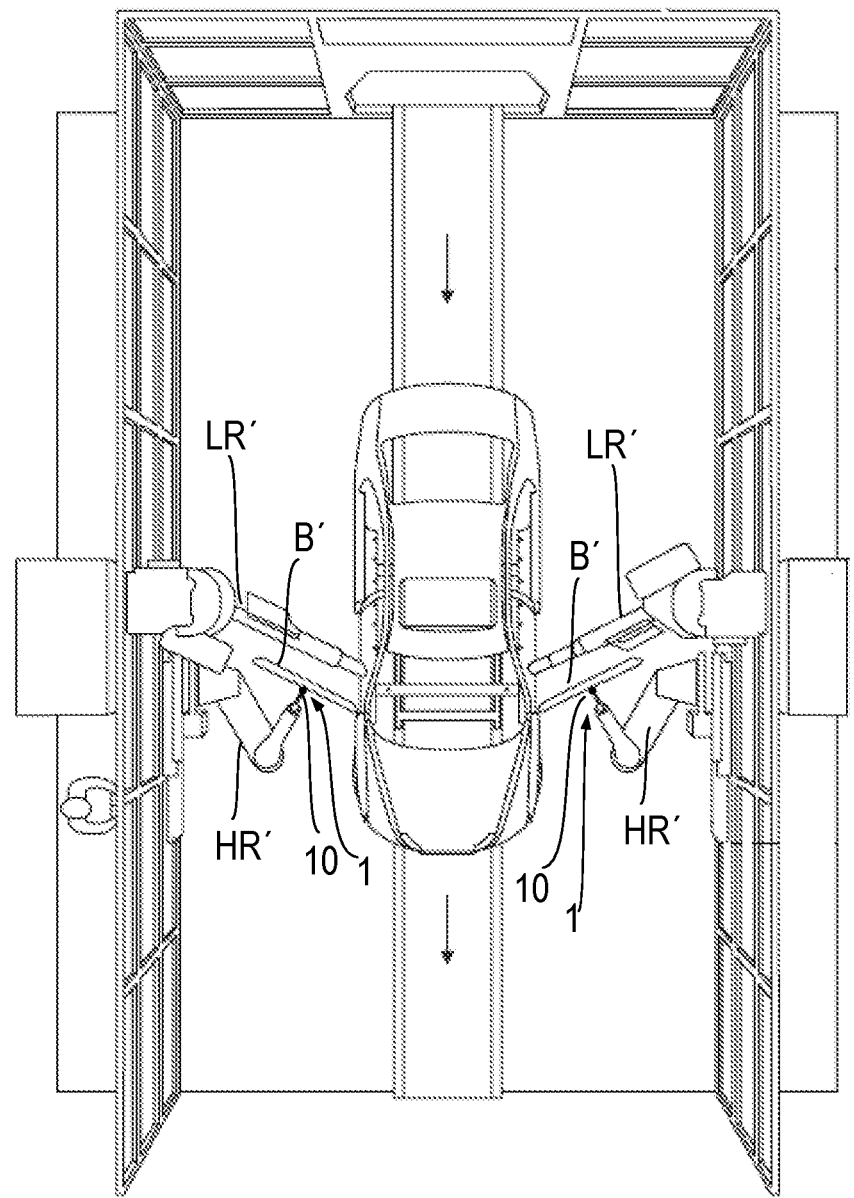
Figure 2B:
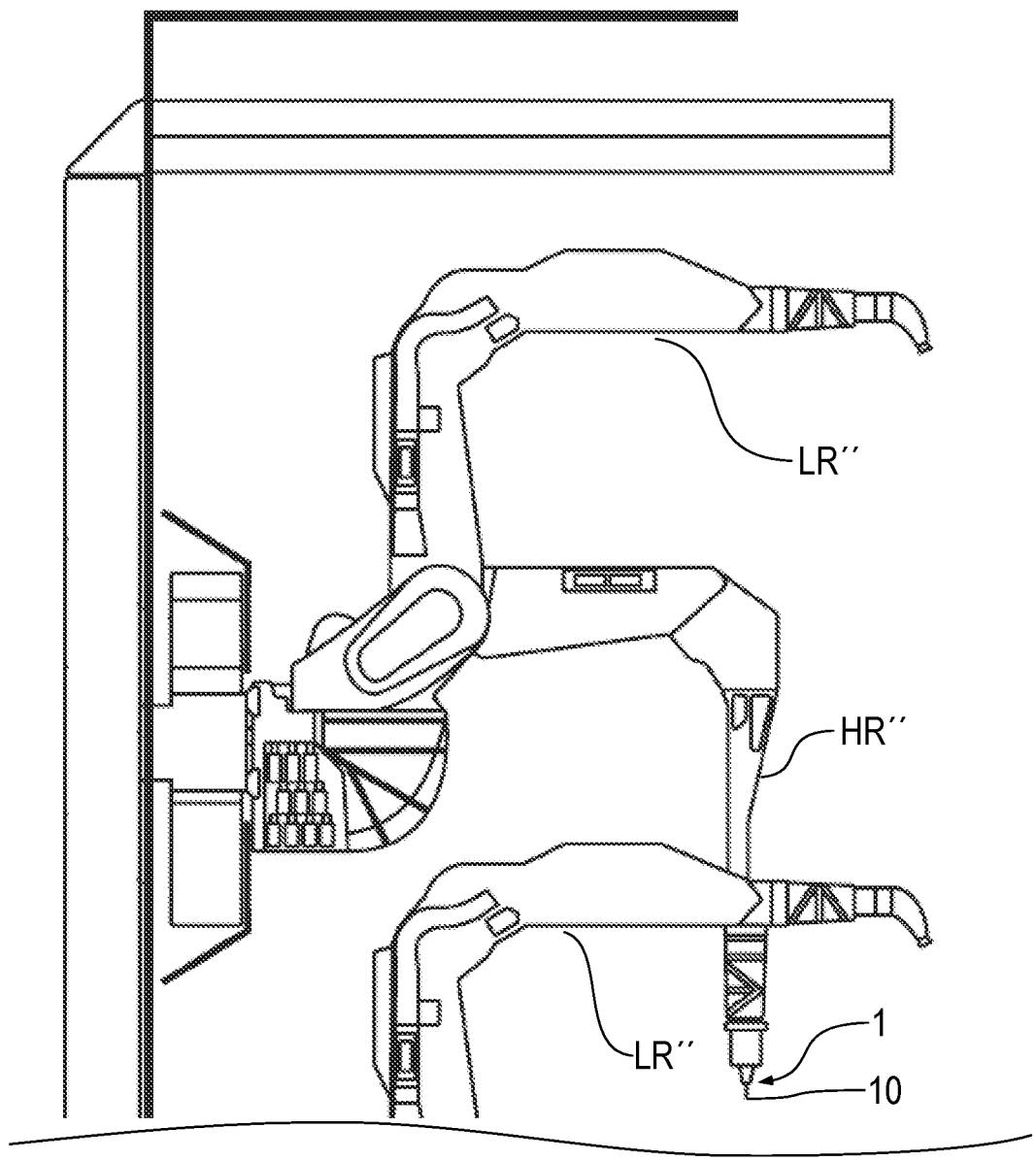
Figure 3:
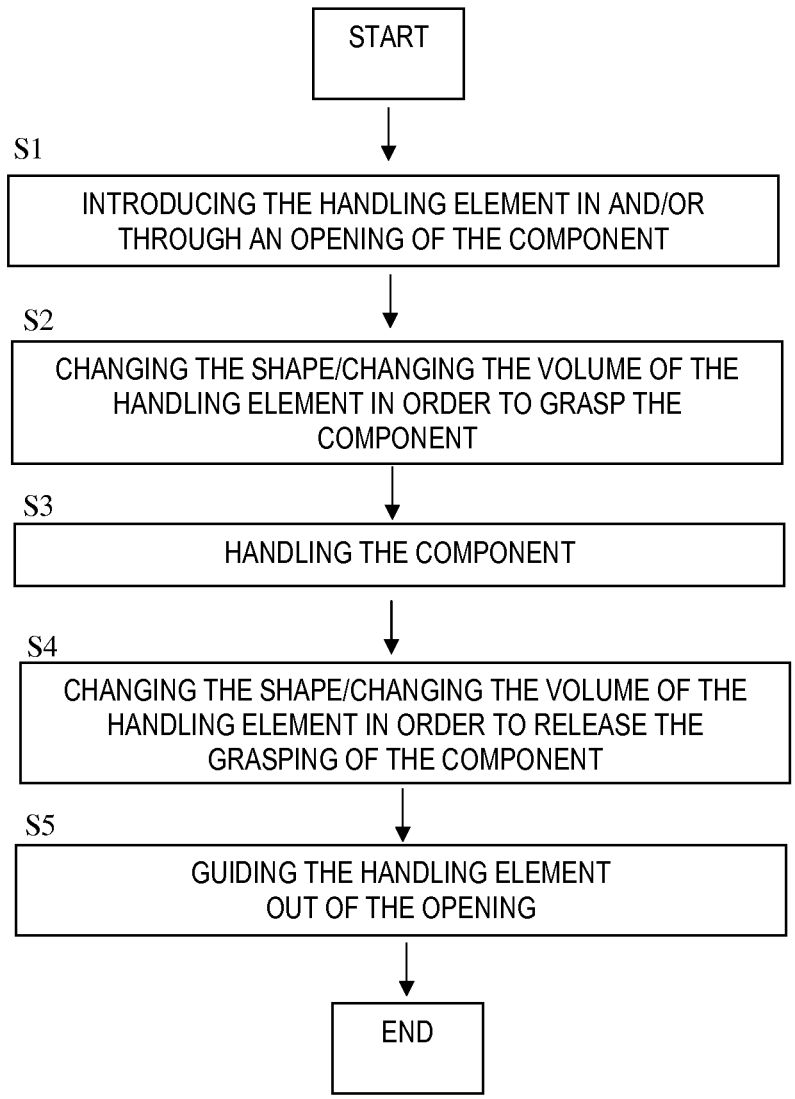
Figure 4:
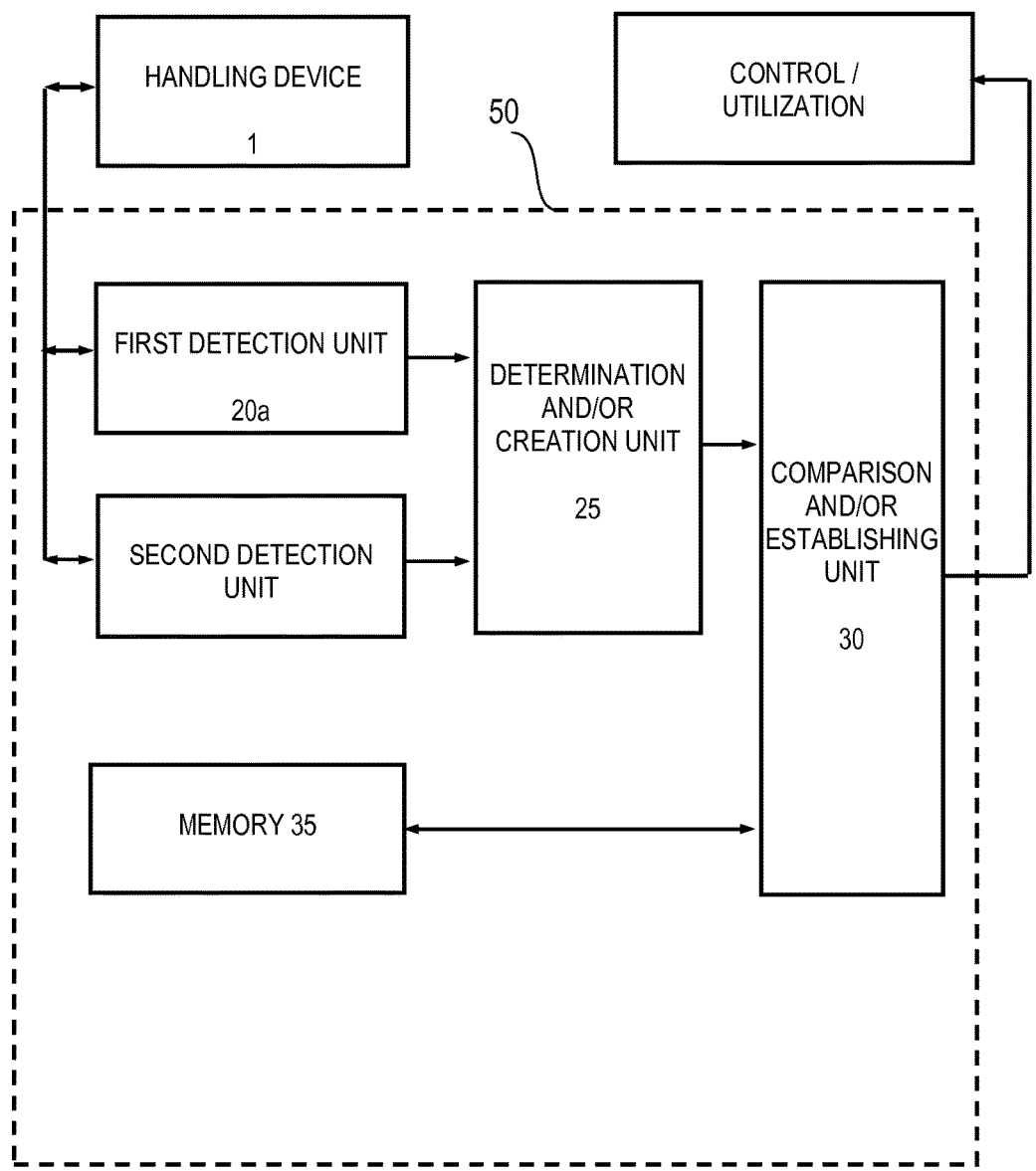
Figure 5A:
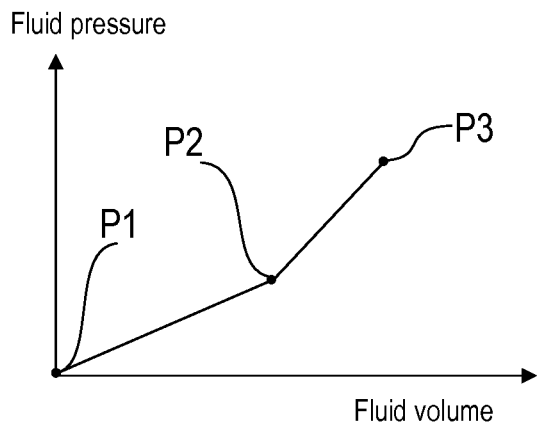
Figure 5B:
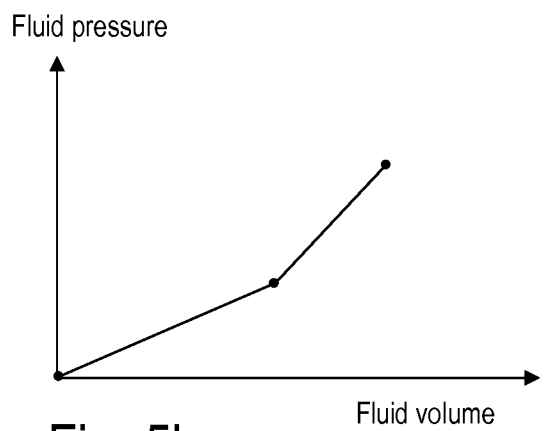
Figure 5C:
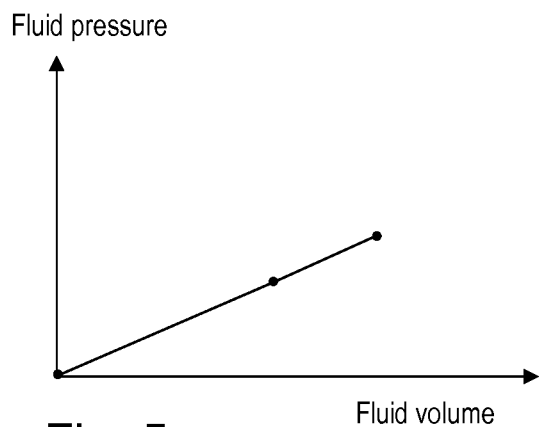

Other advantageous developments of the invention are disclosed in the claims or are evident from the following description of preferred exemplary embodiments in conjunction with the attached figures. The figures show as follows:

FIG. 1 a schematic longitudinal section of an exemplary device for handling components to be coated;

FIG. 2a a plan view onto a paint booth having two handling robots with one device according to FIG. 1 in each case;

FIG. 2b a side view of another paint booth having a different handling robot with a device according to FIG. 1;

FIG. 3 a flow chart of an exemplary method for handling components to be coated;

FIG. 4 a simplified block diagram of an exemplary apparatus for establishing and/or determining operating states/processes of a component to be coated and/or a device; and FIG. 5a-5c schematic fluid pressure/fluid volume curves.

FIG. 1 shows an exemplary schematic longitudinal section of a device 1 for handling components B to be coated. The device 1 is provided for handling components B to be coated, such as hoods, doors, flaps or the like of motor vehicle bodies. In particular, the handling comprises the opening, holding and/or closing of hoods, flaps, doors or the like of motor vehicle bodies. The handling of the component B can take place during and/or before and/or after a coating-agent application onto the component B.

The handling device 1 has a grasping element or gripping element 10, which can be changed in terms of volume and/or changed in terms of shape, in order on the one hand to grasp the component B, as a result of which the component B can be handled, and on the other hand in order to release the grasping of the component B.

The grasping element 10 comprises a volume 10a and a shape 10b. The grasping element 10 is shown by means of a solid line in a de-expanded states, e.g., a shape-downsized and/or volume-downsized and/or essentially de-expanded and/or deflated and/or slackened and/or slack state.

The grasping element 10 is shown by means of a dashed line in an expanded state, e.g., a shape-enlarged and/or volume-enlarged and/or expanded and/or blown-up and/or internal-pressure-loaded state.

The component B to be coated comprises a graspable section in and/or adjacent to an opening Ö of the component B. In the de-expanded state, the grasping element 10 can be guided in and/or through the opening Ö, in order to reach the expanded state in, upstream of and downstream of the opening Ö, as a result of which the component B can be grasped and handled.

After handling, the grasping element 10 can again assume the de-expanded state, as a result of which the grasping can be released and the grasping element 10 can be removed from the opening Ö or from the component B.

As can be seen in FIG. 1, in the expanded state, the grasping element 10 is pressed against the internal contour of the opening Ö and in the process adapts at least to some extent or completely to the internal contour of the opening Ö, as a result of which a non-positive fit and/or a friction fit is formed. As the grasping element 10 is furthermore so enlarged in the expanded state downstream of the opening Ö that it does not fit through the opening Ö, a certain positive fit is furthermore formed.

In FIG. 1, the grasping element 10 is shown in an expanded state in, to some extent upstream of and to some extent downstream of, the opening Ö. It is however also possible that a grasping element is positioned downstream of an opening in order to reach an expanded state completely downstream of the opening. In this embodiment, the grasping element engages behind the opening or the component to be coated, as a result of which e.g. a positive fit can be formed.

The grasping element 10 can be changed in terms of shape and/or changed in terms of volume by means of fluid supply (pressure increase) and/or fluid removal (pressure reduction). For this purpose, the handling device 1 can comprise an apparatus 16, schematically illustrated in FIG. 1, for supplying and/or removing fluid or an interface S in order to be able to be connected to such an apparatus 16.

The apparatus 16 can, e.g., comprise a fluidic apparatus with at least one valve and a fluid pressure source, as a result of which it would only be possible to set and monitor one pressure. The apparatus 16 can, e.g., comprise a fluidic cylinder or a dosing element, which can convey a predetermined fluid volume into the grasping element 10, which can be controlled or regulated and as a result (indirectly) monitored.

Further, it is possible that the handling device 1 comprises one or a plurality of pressure sensors in order to detect any leaks, leakiness or damage of the handling device 1, particularly of the grasping element 10.

The fluid can preferably be air which can in particular be supplied and drained via a fluid supply/drain channel 14 which opens in the grasping element 10 and/or the volume 10a.

The fluid is supplied to the grasping element 10 in order to enlarge the grasping element 10 (or the volume 10a and the shape 10b), as a result of which a grasp of the component B can be achieved. As can be seen in FIG. 1, the grasping element 10 is enlarged by axial lengthening (see arrow Rav) and by circumferential enlargement (see arrow Ru) or enlargement in the radial direction.

The fluid is removed from the grasping element 10 in order to downsize the grasping element 10 (or the volume 10a and the shape 10b), as a result of which the grasping of the component B can be released. As can be seen in FIG. 1, the grasping element 10 is downsized by axial shortening (see arrow Rah) and by circumferential downsizing (see arrow Ru) or downsizing in the radial direction.

As can further be seen in FIG. 1, the grasping element 10 is a balloon-like grasping element, particularly a balloon-like hollow body, which can be changed in terms of shape and/or changed in terms of volume in a balloon-like manner, and which has at least one of the following properties: extensible, inextensible, flexible, elastic, resilient, fluid-tight, inflatable, film-like and membranous.

The handling device 1 further has a support part 11, which keeps the grasping element 10 in a shape in which the grasping element 10 can be guided in and/or through the opening Ö and guided out of the opening Ö again. The support part 11 is arranged in the grasping element 10 and flexibly or elastically constructed and in particular is a spring.

It is however also possible that the grasping element 10 is inherently sufficiently dimensionally stable (particularly in the essentially de-expanded state) in order to be able to be guided in and/or through the opening Ö and guided out of the opening Ö again.

Further, it is possible that the grasping element 10 is constructed from a material with memory/shape-memory effect, as a result of which the grasping element 10 can be kept in a sufficiently stable shape without pressure loading or can advantageously always return to a sufficiently stable initial state again.

Further, the grasping element 10 can have one or a plurality of chambers to which fluid or pressure can be supplied sequentially and/or in parallel or from which fluid or pressure can be removed sequentially and/or in parallel.

The grasping element 10 and/or the support part 11 are therefore not rigidly or stiffly, but rather resiliently, constructed in order, on the one hand, to enable a smooth even grasping of the component B, as a result of which the risk of damaging the component B can be reduced or prevented in an advantageous manner. On the other hand, the resilient construction means that, in the event of an unintended contact or impact between grasping element 10 or support part and component B, the risk of damaging the component B, the grasping element 10 and the robot/manipulator HR guiding the grasping element 10 (e.g., a SCARA robot or a robot with up to 7 degrees of freedom) can be reduced or prevented in an advantageous manner. The handling device 1 is in this case connected via an interface S schematically illustrated in FIG. 1 to the robot HR.

The grasping element 10 comprises a fastening mechanism 12 for connecting to a fastening structure 13 on the handling device 1. The fastening mechanism 12 can, e.g., be a collar or a cuff with an internal thread, wherein the fastening structure 13 can provide a fitting external thread. Reference number 15 shows a predetermined breaking point. The predetermined breaking point 15 is for example arranged on the fastening mechanism 12 and configured in such a manner that it breaks in the case of overloading, e.g., if the component B jams during handling.

The fastening mechanism 12 and/or the fastening structure 13 can also be provided as a latching, snap, clamping or hook and loop connection. In this case it is possible to shape the connection between fastening mechanism 12 and fastening structure 13 in such a manner that the connection is preferably released without damage in the case of overloading, e.g. if the component B jams during handling, as a result of which the risk of damaging the handling device 1, the robot HR guiding the handling device 1 and/or the component B can be reduced or prevented in an advantageous manner.

FIG. 2a shows a plan view of a paint booth having two handling robots HR' each with one handling device 1 according to FIG. 1. In particular, two grasping elements 10 can be seen, which are guided by one handling robot HR' in each case and which in each case grasp and handle one component B' in the form of a motor vehicle door. Further, two painting robots LR' can be seen, which guide an application element for applying a coating agent.

FIG. 2b shows a section of a side view of another paint booth having another handling robot HR" with a handling device 1 according to FIG. 1. In particular, the grasping element 10 can be seen, which is guided by the handling robot HR", in order to grasp and to handle a component (not shown in FIG. 2b). Further, two painting robots LR" can be seen, which in each case guide one application element for applying a coating agent.

It is also possible to attach the handling device 1 to a painting robot, which then also acts as handling robot.

FIG. 3 shows a flow chart of an exemplary method for handling components to be coated.

In a first step S1, a grasping element 10 is guided in and/or through an opening Ö in a component B, whilst the grasping element 10 is in an essentially de-expanded state.

In a second step S2, the grasping element 10 is changed in terms of shape and/or changed in terms of volume, in particular brought to an expanded state, by means of fluid supply, in order to grasp the component B. Further, a check can be carried out as to whether the component B is grasped by the grasping element 10 or not.

In a third step S3, the component B grasped by the grasping element 10 is handled. If the component B is a hood, flap or door of a motor vehicle body, the handling generally includes opening, holding and closing of the hood, door or flap. Further, a force or momentum monitoring can be carried out during the handling, particularly during the movement, e.g., in order to prevent damage.

After successful handling, the grasping element 10 is again changed in terms of shape and/or changed in terms of volume in a fourth step S4 by means of fluid removal (e.g. fluid withdrawal or draining of fluid), particularly brought to an essentially de-expanded state, in order to release the grasping of the component B.

If the grasping element 10 is in the essentially de-expanded state and the grasping between grasping element 10 and component B is released, the grasping element 10 is guided out of the opening Ö again and removed from the component B in a fifth step S5.

After step S5 has been executed, the handling of another component can be carried out.

FIG. 4 shows a simplified, schematic block diagram of an exemplary apparatus 50 for a handling device 1 for establishing and/or determining various operating states of the handling device 1, in particular of the grasping element 10, and/or the component B, for example in order to establish or to determine incorrect grasping or an absence of a component B.

The apparatus 50 can e.g. be connected to a computer, an arithmetic unit, a memory, a control, a CPU (processor), etc. or comprise some or all of these components.

The apparatus 50 has a first detection unit 20a for detecting the fluid pressure with which the grasping element 10 is loaded.

The apparatus 50 can have a second detection unit 20b for detecting the fluid volume with which the grasping element 10 is loaded.

Here, the two following principles are conceivable in particular.

First: Fill and during the process determine the volumetric flow in order to set the volume over time.

Second: A predetermined (required or constant) volume is located in a dosing organ which is provided in order to provide its volume to the grasping element 10. In this case, no volumetric flow measurement is necessary, rather just pressure detection (e.g. for fault detection), for which reason the second detection unit 20*b* could also be omitted.

As can be seen in FIG. 4, a determination and/or creation unit 25 is provided in order to utilize the fluid pressures and fluid volumes detected (by the first detection unit 20*a* and the second detection unit 20*b*) and/or the fluid pressures and fluid volumes with which the grasping element 10 is loaded.

The determination and/or creation unit 25 is provided in order to determine and/or to create at least one fluid pressure/fluid volume curve based on the fluid pressures and the fluid volumes which are detected by the first and/or the second detection unit 20*a*, 20*b* and/or with which the grasping element 10 is loaded (see e.g. FIGS. 5*b*, 5*c*).

The determination and/or creation unit 25 in turn communicates the determined and/or created fluid pressure/fluid volume curve to a comparison and/or establishing unit 30. The comparison and/or establishing unit 30 compares at least one determined and/or created fluid pressure/fluid volume curve with at least one reference fluid pressure/fluid volume curve stored in a memory 35 (see e.g. FIG. 5*a*).

By means of a comparison of a determined and/or created fluid pressure/fluid volume curve with a stored reference fluid pressure/fluid volume curve, various operating states (e.g. defective grasping or even no grasping at all of a component B) can be established or determined.

The stored reference fluid pressure/fluid volume curves can e.g. describe correct states or processes or typical defective states or processes.

If the determined and/or created fluid pressure/fluid volume curve does not correspond to a stored reference fluid pressure/fluid volume curve which describes a correct process or state, then the conclusion can be drawn that generally a defective state or process is present.

If the determined and/or created fluid pressure/fluid volume curve essentially corresponds to a stored reference fluid pressure/fluid volume curve, then the conclusion can be drawn that a certain correct process or state is present or that a certain defective state or process is present.

The results determined and/or established by the apparatus 50, particularly the comparison and/or establishing unit 30, can be communicated, e.g., to a control (e.g. a control for the handling robot HR, the handling device 1, a painting robot or another component of a painting installation dependent on the handling) for further utilization and processing.

The first detection unit 20*a*, the second detection unit 20*b*, the determination and/or creation unit 25, and also the comparison and/or establishing unit 30 are illustrated as separate units. It is, however, also possible to combine separately illustrated units in one unit (e.g., to combine the first and second detection unit 20*a*, 20*b* to form one unit, to combine the determination and/or creation unit 25 and the comparison and/or establishing unit 30 to form one unit, etc.).

By way of example, FIG. 5*a* shows a stored reference fluid pressure/fluid volume curve which represents correct grasp between grasping element 10 and component B.

Point P1 characterizes the start of the loading of the grasping element 10 with fluid/pressure.

The region between point P1 and P2 characterizes a state or process in which the grasping element 10 expands but the component B is not yet grasped.

Point P2 characterizes the start of the grasping between grasping element 10 and component B.

The region between point P2 and P3 characterizes a state or process in which the grasping element 10 expands and the component B is grasped.

Point P3 characterizes a state or process in which no further fluid/pressure is supplied to the grasping element 10, the component B is grasped and thus can be handled.

The FIGS. 5*b*, 5*c* show exemplary fluid pressure/fluid volume curves determined and/or created by the determination and/or creation unit 25, representing a present loading of the grasping element 10 with fluid pressure/fluid volume. By way of example, FIG. 5*b* shows a fluid pressure/fluid volume curve in which the grasping element 10 correctly grasps a component B, wherein by way of example FIG. 5*c* shows a fluid pressure/fluid volume curve in which the grasping element 10 does not grasp a component B or no component B is present.

The stored reference fluid pressure/fluid volume curve according to FIG. 5*a* essentially corresponds to the fluid pressure/fluid volume curve according to 5*b*, so that after a comparison of the curves, the conclusion can be drawn that there is a correct grasp between grasping element 10 and component B.

The stored reference fluid pressure/fluid volume curve according to FIG. 5*a* does not however correspond to the fluid pressure/fluid volume curve according to 5*c* (in particular no bend occurs at point P2, because no component B has been grasped), so that after a comparison of the curves, the conclusion can be drawn that there is no grasp between grasping element 10 and component B or no component B is present.

The invention is not limited to the preferred exemplary embodiments described above. Instead, a plurality of variants and modifications are possible, which also make use of the concept of the invention and thus fall within the scope of protection. The invention, in particular, also claims protection for the object of the sub-claims independently of the object of the prior claims referred to.

The invention claimed is:

1. A device, comprising:
   a grasping element having a resilient support that is a sole support disposed therein; and
   a fluid supply to the grasping element such that at least one of supply and removal of the fluid changes at least one of a volume and a shape of the grasping element.

2. The device of claim 1, wherein the grasping element is configured to fit within an opening in the component in a de-expanded state, and further wherein the grasping element is configured to be pressed against both sides of the opening in an expanded state, whereby in the de-expanded state pressure loading onto the component is released.

3. The device of claim 1, wherein the grasping element is deformable to an internal contour of at least a section of an opening in the component.

4. The device of claim 1, wherein the fluid supply extends to, and ends at, a base of the resilient support.

5. A device, comprising:
   a grasping element having a resilient support disposed therein; and
   a fluid supply to the grasping element such that at least one of supply and removal of the fluid changes at least one of a volume and a shape of the grasping element;
   wherein the resilient support is configured to move along, and bend away from, a central axis.

6. The device of claim 5, wherein the grasping element is configured to fit within an opening in the component in a de-expanded state, and further wherein the grasping element is configured to be pressed against both sides of the opening in an expanded state, whereby in the de-expanded state pressure loading onto the component is released.

7. The device of claim 5, wherein the grasping element is deformable to an internal contour of at least a section of an opening in the component.

8. The device of claim 5, wherein the fluid supply extends to, and ends at, a base of the resilient support.

* * * * *